United States Patent Office 3,557,055
Patented Jan. 19, 1971

3,557,055
POLYESTER-ETHERS
Lucien Bonnard and René Pich, Lyon, France, assignors to Societe Rhodiaceta, Paris, France
No Drawing. Filed July 31, 1967, Ser. No. 656,999
Claims priority, application France, Aug. 2, 1966, 71,826
Int. Cl. C08g 17/08
U.S. Cl. 260—47
6 Claims

ABSTRACT OF THE DISCLOSURE

Polyesters suitable for use in textile fibres and films and of being dyed with plastosoluble dyes comprise mainly ethylene (or other alkylene) terephthalate structural units, but also 5–35% of structural units derived from terephthalic acid and certain α-ω-dihydroxy aromatic ethers, namely those of formula:

HO.R$_3$.OAr[OR$_2$—OAr]$_n$OR$_3$OH

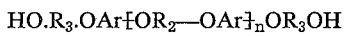

in which R$_2$ and R$_3$ are divalent hydorcarbon radicals, of which R$_2$ may contain an ether linkage, Ar is a divalent aromatic radical, usually phenylene, and $n$ is 4 or more.

---

This invention relates to new linear thermoplastic polyester ethers which can be melt-extruded in the form of filaments and films.

Linear thermoplastic polyester filaments and films derived from terephthalic acid and ethylene glycol have been produced commercially for many years, and have found broad outlets because of their excellent mechanical properties and their good heat stability and resistance to solvents.

However the usual dyeing methods could not be directly applied to these articles because of the absence therefrom of reactive sites capable of fixing acid or basic dyestuffs, and because the high degree of crystallinity of the polymer requires that dyeing by means of plastosoluble dyestuffs must be carried out at a high temperature (above 100° C.) under pressure and/or in the presence of special agents which assist the uptake of the dyestuffs, called carriers.

Several processes intended to improve the dyeing affinity of polyesters have been studied; in particular, it has been proposed to include in the polymer chain units which carry reactive sites or which modify the crystallinity of the polymer. For example polyesters have been preapred from terephthalic acid, ethylene glycol and hydroquinone-bis(3-hydroxypropyl)ether or hydroquinone-bis(2-hydroxyethyl)ether and from terephthalic acid, ethylene glycol and the (2-hydroxyethyl)ether of p-hydroxybenzoic acid.

While these polymers have greater affinity for plastosoluble dyestuffs than does polyethylene terephthalate, if the improvement is to be marked and of value it is necessary to use so much of the compound having an ether linkage than the melting point of the resulting polymer is reduced to a level which for some purposes is unacceptable.

It has also been proposed to produce block copolymers by mixing polyesters derived from terephthalic acid and a polymethylene glycol such as ethylene glycol and polyesters derived from terephthalic acid and polyoxyethylene glycol (i.e., a polyethylene glycol) in the molten state. These products have good dyeing and thermal properties, but are sensitive to oxidation at high temperatures, which is very disadvantageous when they are melt spun or melt extruded to form filaments or films.

The present invention provides new linear thermoplastic polyester-ethers which can be extruded to form filaments and films having good affinity for dyestuffs. In these polyesters the chain consists primarily of units of formula:

but also comprise 5 to 35% by weight of units of formula:

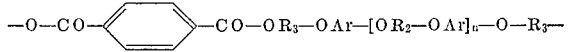

in which R$_1$ is a linear alkylene radical containing 2 to 8 carbon atoms, preferably —CH$_2$—CH$_2$—, R$_2$ is a divalent hydrocarbon radical, optionally comprising an ether linkage, R$_3$ is a divalent hydrocarbon radical, Ar is a divalent aromatic radical, and $n$ is an integer equal to or greater than 4.

The polyesters of the invention not only have good affinity for dyestuffs, but also have melting points above 250° C. and frequently above 255° C., and good resistance to oxidation at elevated temperatures. They are advantageously prepared from terephthalic acid, preferably in the form of a lower alkyl diester, an alkylene glycol and a dihydroxy compound of formula:

HO—R$_3$—O—Ar[—O—R$_2$—O—Ad]$_n$O—R$_3$—OH in which R$_2$, R$_3$, Ar and $n$ have the meanings given above. Preferably, terephthalic acid is the sole acid constituent, and the alkylene glycol is ethylene glycol. The dihydroxy compound can be, and preferably is, obtained by a method which is in itself known, and which consists in condensing a metaldiphenate with slightly less than an equimolar amount of a α,ω-dihalogenoalkane at an elevated temperature and reacting the product either with a halogeno alcohol, preferably glycol chlorohydrin, or with an alkylene glycol directly. In one preferred method of working, the latter reaction is carried out, in the same time than the production of the polyester, with the excess of the glycol.

As the metal diphenate, metal derivatives of hydroquinone, resorcinol, dihydroxy-diphenyl-methanes, p,p'-dihydroxy-diphenyl-2,2-propane, dihydroxy-diphenyl-cycloalkanes such as p,p'-dihydroxy-diphenyl-1,1-cyclohexane, or p,p'-dihydroxy-diphenyl-sulphone may for example be used.

Dichloroalkanes or dibromoalkanes, such for example as dichlorobutane, dibromoethane or dichlorodiethyl ether, may be used as the α,ω-dihalogenoalkane.

The polyester-ethers of the invention can be obtained by heating the monomeric starting materials in the presence of known catalysts for ester interchange and for polycondensation, the final stages being effected under low pressure until the desired viscosity is attained.

The polyester-ethers of the invention can be shaped into filaments or films from a melt, and the resulting articles can be stretched under conditions similar to those used for polyethylene terephthalate.

The following examples illustrate the invention:

EXAMPLE 1

The following are introduced into a 1-liter autoclave:

|   | G. |
|---|---|
| p,p'-dihydroxy-2,2-diphenylpropane | 228 |
| 1,4-Dichlorobutane | 115 |
| Soda | 80 |
| Water | 400 |

The mixture is heated for three hours at 100° C. and then for 5 hours at 170° C. After cooling, the solid product is filtered off, dissolved in 2 litres of toluene, and reacted with 10 g. of glycol chlorohydrin by heating under reflux for 30 minutes.

On precipitation by means of methanol, a polymer of melting point 140° C., of molecular weight, measured ebullioscopically in dichlorethane, of 2050 and of formula:

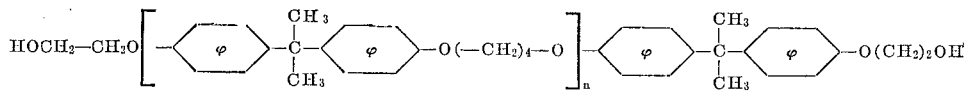

is obtained in a yield of 95%.

56.4 g. of this dihydroxylated polyether are reacted with the following in a 1-litre autoclave:

| | G. |
|---|---|
| Dimethyl terephthalate | 388 |
| Ethylene glycol | 310 |
| Hydrated zinc acetate | 0.106 |
| Antimony oxide | 0.176 |

The mixture is heated to 205° C. in order to effect ester interchange and to distil 160 ml. of methanol. The temperature is then raised to 240° C. while distilling off the excess glycol, and finally the reaction mixture is progressively raised to 275° C. while reducing the pressure to 0.3 mml. of mercury. After 1 hour 30 minutes of polycondensation under these conditions the polymer (A), which has a softening point of 254° C. and an intrisic viscosity (measured in an Ostwald viscometer using a 1% solution in o-chlorophenol) of 0.64 is poured out.

(A polymer of identical properties is obtained if the product of the condensation of sodium p,p'-dihydroxy-2,2-diphenylpropylene and 1,4-dichlorobutane, acidified, purified by dissolving in toluene and precipitating with methanol, is reacted with dimethyl terephthalate and ethylene glycol.) This polymer is extruded in the form of a yarn of 7 filaments, which after stretching in a ratio of 5 has a gauge of 35 denier, a tensile strength of 4 g./denier and an elongation at break of 18%.

A comparison sample is prepared under the same conditions from the following:

| | G. |
|---|---|
| Dimethyl terephthalate | 388 |
| Ethylene glycol | 310 |
| Hydrated zinc acetate | 0.106 |
| Antimony oxide | 0.176 |

The resulting polymer (B) has a softening point of 261° C. and an intrisic viscosity of 0.60.

A yarn of 38 denier, and tensile strength 4.5 g./denier at an elongation at break of 15% is obtained by extrusion through a spinneret having 7 holes and stretching in a ratio of 5.

A polymer (C) is also prepared, from—

| | G. |
|---|---|
| Dimethyl terephthalate | 388 |
| Ethylene glycol | 310 |
| Hydrated zinc acetate | 0.106 |
| Antimony oxide | 0.176 |
| 2,2-di(ω-hydroxyethoxyphenyl)propane | 63.2 | under conditions identical to those of the preceding experiments.

A polymer is obtained whose content of ether groups relative to terephthalate units is the same as that of the polyester of the invention (A): its melting point is only 237° C. and its intrisic viscosity is 0.51.

This polymer is extruded in the form of a 7-filament yarn which after stretching has a tensile strength of 4 g./denier for an elongation at break of 17%.

Samples of yarns (A), (B) and (C) are dyed under the same conditions at 100° C., using a dye bath containing 3%, relative to the material to be dyed, of Celliton Fast Blue FFR (Colour Index No. 61,505).

Yarns (A) and (C) showed a deep blue shade whilst yarns (B) are scarcely affected.

If further samples of yarns are treated for 10 minutes at 150° C., yarns (A) show a shrinkage of 22%, yarns (B) a shrinkage of 8% and yarns (C) a shrinkage of 30%.

EXAMPLE 2

A polyether is prepared by reaction of the sodium derivative of hydroquinone with dibromoethane, and this after reaction with glycol chlorhydrin has a molecular weight of 800 and corresponds to the formula:

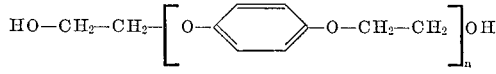

This dihydroxylated polyether is polycondensed with dimethyl terephthalate and ethylene glycol, using 7% by weight relative to the dimethyl terephthalate, following the process as described in Exampl 1.

A polymer having a softening point of 257° C. and an intrinsic viscosity of 0.60 is obtained. On extrusion and stretching in a ratio of 5, this polymer yields yarns having a tensile strength of 4 g./denier for 15% elongation, shrinking 18% on 10 minutes treatment at 150° C., and becoming dyed in a fast shade on dyeing at 100° C. in a bath containing 3% of Celliton Fast Blue FFR based on the material to be dyed.

EXAMPLE 3

A polyether of formula

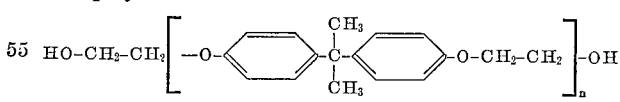

and of molecular weight 2000 is prepared from p,p'-dihydroxy-2,2-diphenylpropane, dibromoethane and glycol chlorhydrin. On polycondensing this dihydroxylated polyether with dimethyl terephthalate and glycol by the process described in Example 1, polymers and yarns whose properties are indicated in the following table are obtained for polyether contents of 14, 16.5 and 20% by weight relative to the dimethyl terephthalate.

| | Polymer | | Yarn | | | |
|---|---|---|---|---|---|---|
| Percentage of polyether | Softening point | Intrinsic viscosity | Tensile strength | Elongation | Shrinkage at 150° C. | Dyestuff affinity |
| 14 | 254 | 0.64 | 4 | 18 | 22 | Medium. |
| 16.5 | 252 | 0.64 | 4 | 19 | 25 | Good. |
| 20 | 250 | 0.61 | 3.9 | 20 | 30 | Very good. |

EXAMPLE 4

A dihydroxylated polyether of molecular weight 2,300 and of formula:

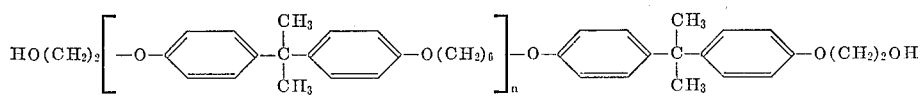

is obtained from p,p'-dihydroxy-2,2-diphenylpropene, dibromohexane and glycol chlorohydrin.

On polycondensation with dimethyl terephthalate and ethylene glycol at the rate of 15% by weight relative to the dimethyl terephthalate, the polyether yields a polymer having a softening point of 254° C. and an intrinsic viscosity of 0.50. On extruding this polymer through a spinneret having 7 holes and stretching it in a ratio of 5, there is obtained a yarn of 35 denier, of tensile strength 4 g./denier and of elongation at break 19%, having very good affinity for plastosoluble dyestuffs on dyeing at 100° C. without a carrier.

EXAMPLE 5

A dihydroxylated polyether of molecular weight 1,800 and of formula:

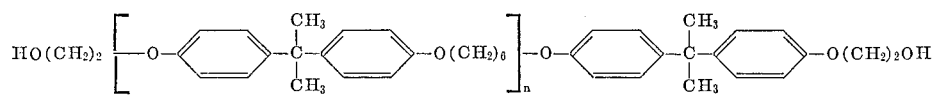

is prepared from p,p'-dihydroxy-2,2-diphenylpropane, dibromodecane and glycol chlorohydrin.

This polyether is polycondensed with dimethyl terephthalate and ethylene glycol at the rate of 18% by weight relative to the dimethyl terephthalate, by the process described in Example 1. The resulting polymer has a softening point of 252° C. and an intrinsic viscosity of 0.59. On extrusion and stretching it yields yarns having a tensile strength of 3.8 g./denier, elongation at break 21%, and very good affinity for plastosoluble dyestuffs when dyed at 100° C. without a carrier.

We claim:
1. Film- and fibre-forming polyesters whose chain consists primarily of units of formula:

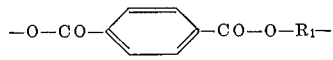 (A)

but also contains 5 to 35% by weight of units of formula:

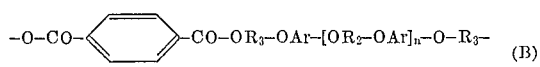 (B)

in which $R_1$ is a linear alkylene radical containing 2 to 8 carbon atoms, $R_2$ is a radical selected from the class consisting of linear alkylene radicals containing 2 to 10 carbon atoms and $-CH_2CH_2OCH_2CH_2-$, $R_3$ is the radical $-CH_2.CH_2-$, Ar is a divalent aromatic radical derived by the removal of the hydroxyl groups from a member of the class consisting of hydroquinone, resorcinol, the dihydroxydiphenyl methanes, p,p'-dihydroxydiphenyl-2,2-propane, the dihydroxydiphenylcyclohexanes and p,p'-dihydroxydiphenylsulphone, and $n$ is an integer at least equal to 4.

2. Film- and fibre-forming polyesters according to claim 1 wherein (B) is:

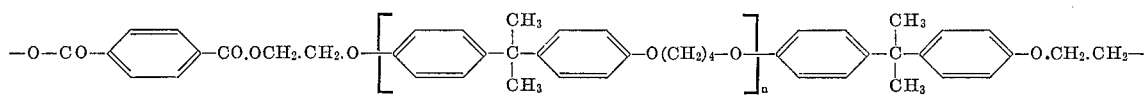

in which $n$ is an integer at least equal to 4.

3. Film- and fibre-forming polyesters according to claim 1 wherein (B) is:

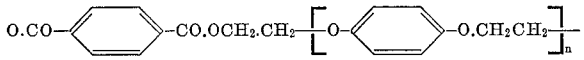

in which $n$ is an integer at least equal to 4.

4. Film- and fibre-forming polyesters according to claim 1 wherein (B) is:

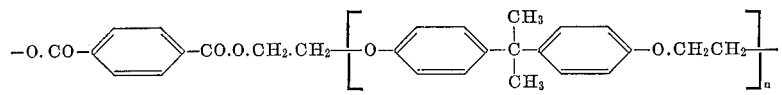

in which $n$ is an integer at least equal to 4.

5. Film- and fibre-forming polyesters according to claim 1 wherein (B) is:

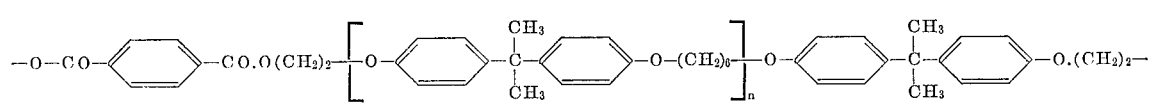

in which $n$ is an integer at least equal to 4.

6. Film- and fibre-forming polyesters according to claim 1 wherein (B) is:

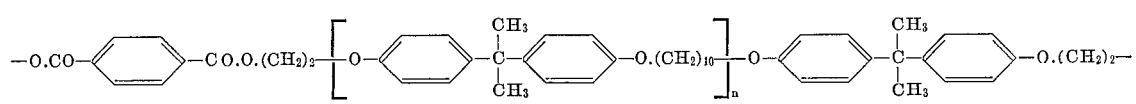

in which $n$ is an integer at least equal to 4.

(References on following page)

References Cited

UNITED STATES PATENTS

| | | | |
|---|---|---|---|
| 3,023,192 | 2/1962 | Shivers | 260—75 |
| 3,337,500 | 8/1967 | Schnegg et al. | 260—47 |
| 3,381,057 | 4/1968 | Senoo et al. | 260—860 |

WILLIAM H. SHORT, Primary Examiner

M. GOLDSTEIN, Assistant Examiner

U.S. Cl. X.R.

8—55; 260—49, 860